(12) United States Patent
Maher et al.

(10) Patent No.: US 7,031,863 B2
(45) Date of Patent: Apr. 18, 2006

(54) VARIABLE CONDITION RESPONSIVE SENSE SYSTEM AND METHOD

(75) Inventors: Thomas R. Maher, Rehoboth, MA (US); David L. Corkum, Attleboro, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/743,363

(22) Filed: Dec. 22, 2003

(65) Prior Publication Data

US 2005/0137821 A1    Jun. 23, 2005

(51) Int. Cl.
*G01C 19/00*    (2006.01)

(52) U.S. Cl. .................. 702/104; 702/57; 702/58; 702/59

(58) Field of Classification Search .......... 702/127, 702/58, 57, 59, 104, 117; 324/207.19, 610, 324/648, 680
See application file for complete search history.

(56) References Cited

U.S. PATENT DOCUMENTS

| | | |
|---|---|---|
| 4,574,356 A | 3/1986 | Schattschneider et al. |
| H000081 H | 7/1986 | Szabo et al. |
| 5,014,238 A | 5/1991 | McLeish et al. |
| 5,068,811 A | 11/1991 | Johnston et al. |
| 6,040,779 A * | 3/2000 | Pfaff et al. .................. 340/661 |
| 6,422,088 B1 * | 7/2002 | Oba et al. ...................... 73/754 |
| 6,433,554 B1 * | 8/2002 | Kawate et al. .............. 324/500 |
| 6,765,391 B1 * | 7/2004 | Corkum et al. ............. 324/610 |
| 2002/0103613 A1 * | 8/2002 | Maher et al. ............... 702/127 |

FOREIGN PATENT DOCUMENTS

| EP | 1111344 A1 | 6/2001 |
|---|---|---|
| EP | 1235053 A2 | 8/2002 |

OTHER PUBLICATIONS

U.S. Appl. No. 10/038,719 entitled Condition Responsive Sense System and Method filed Dec. 21, 2001 (Inventors: Thomas R. Maher, John A. Powning).

\* cited by examiner

*Primary Examiner*—John Barlow
*Assistant Examiner*—Stephen J. Cherry
(74) *Attorney, Agent, or Firm*—Russell E. Baumann; Frederick J. Telecky, Jr.

(57) ABSTRACT

Signal conditioning of multiple sense elements is shown for providing information to a system requiring high accuracy and robust fault coverage. A first signal conditioning ASIC (10) pre-conditions the sense element data and a second system control ASIC (14) mathematically solves predetermined compensation relations based on the output of ASIC (10) and stored compensation data to fully condition the sensor output signal(s). The sense elements (1–6) are each formed by two half bridges whose inputs are pre-conditioned by separate, identical signal conditioning paths to provide highly accurate sense and diagnostic information.

14 Claims, 8 Drawing Sheets

VARIABLE CONDITION RESPONSIVE SENSE SYSTEM AND METHOD

FIELD OF THE INVENTION

This invention relates generally to systems for sensing a variable condition such as pressure, temperature, acceleration, torque, force and the like at a plurality of locations and more particularly to apparatus and methods for signal conditioning multiple sense elements.

BACKGROUND OF THE INVENTION

Many applications call for the sensing of a condition, such as pressure, acceleration, torque and force, at a plurality of locations. By way of example in the automotive environment, electro-hydraulic brake or EHB systems generally have six locations that require sensing of the fluid pressure. Pressure sensing is required at each wheel for closed loop brake force control, at a location to sense driver input and at the pressure accumulator to sense system reserve pressure. Hydraulic sensing points are all routed through the hydraulic control unit or HCU having a system controller, i.e., microprocessor, so that there exists one member at which all different hydraulic circuit pressures are sensed. The provision of six discrete pressure sensors with full conditioning electronics results in suitable operation; however, it also results in a total pressure sensor cost which is higher than desirable compared to the remaining system component costs.

In copending, coassigned application Ser. No. 10/036,719, the subject matter of which is incorporated herein by this reference, a low cost system and method is disclosed and claimed in which a plurality of bridge type sense elements are connected to an ASIC (application specific integrated circuit) with the output of the sense elements sequentially connected to a common signal conditioning circuit path by analog multiplexing. The sense element signal is conditioned by the signal conditioning circuit of the ASIC to provide partial conditioning comprising basic calibration data. Complete characterization data provided at the time or manufacture for all the sense elements is stored in non-volatile memory of the ASIC and is transferred to a host controller, e.g., microprocessor, upon command to enable the host controller to perform appropriate mathematical operations to provide the additional amount of compensation required to complete the signal conditioning.

The ASIC also includes diagnostic fixed test bridges for diagnosing ASIC faults and a signal diagnostic path for diagnosing sense element and sense element connection faults.

The specific sense elements disclosed in the application are formed of individual strain bridges known in the art, such as silicon resistor bridges bonded to a diaphragm through glass material fired at high temperatures and adapted for placement in a fluid pressure port. When pressurized, fluid in the pressure port causes the diaphragms and bridges to undergo elastic strain. Because the resistors in the bridges are made of silicon, they exhibit a piezoresistive effect exhibiting a change in resistance when subjected to strain. By applying a voltage to the bridges, a small voltage change results at the output of the bridges.

Although the above system provides diagnostic resolution suitable for certain applications, there is a need for a higher degree of resolution in other applications, particularly in some of the most safety critical applications. For example, the fixed test bridges provide information on specific discrete points of the signal path, in the example shown, two discrete points. While these are effective for a majority of problems, there is a possibility that some errors in the signal path could go undetected.

Further, with respect to diagnosing sense element and sense element connection faults, the degree of resolution which is possible to obtain is limited due to inherent tolerances of the sensors, signal dependency on the sensed conditions such as pressure and temperature and other behavior associated with strain gauges.

SUMMARY OF THE INVENTION

It is an object of the invention to provide a reliable, low cost sensor having high accuracy as well as the ability to diagnose error problems to a finer resolution than in the prior art system noted above. Another object of the invention is the provision of a low cost sense signal conditioning system for a plurality of sensors responsive to variable conditions such as pressure, force, acceleration, torque, temperature and the like suitable for use with ever more safety critical applications.

Briefly, in accordance with a preferred embodiment of the invention, a system comprises a multiple sensor ASIC comprising four analog switching multiplexers connected to a plurality of sense elements. Each sense element is made up of two separate half bridges with the bridge bias of each positive bridge half connected to a respective addressable port in one multiplexer and the bridge bias of the minus bridge half connected to a respective addressable port in the second multiplexer. The output of each positive bridge halve is connected to a respective addressable port in the third multiplexer and the output of each minus bridge half is connected to a respective addressable port of the fourth multiplexer.

The half bridges of each sensor are treated independently of each other having independent variable resistive bridge drives and signal paths. The analog signal paths are mildly trimmable including some offset and gain trim. As in the system described in Ser. No. 10/036,719 described above, only the minimum amount of electronic calibration of the pressure and temperature signals are provided in order to minimize complexity and cost as well as to provide compensation by the system controller with enhanced accuracy and diagnostics. The temperature signal path from the bridge bias voltage is untrimmed since such trimming is unnecessary in the particular example of the preferred embodiment described, but may include trimmable gain for other examples, if desired. The outputs, in the specific embodiment being described, pressure and temperature, in each path are synchronously sampled and the data held and fed into a single analog to digital converter (ADC). The two paths produce opposing pressure and temperature analog signals and due to their opposite polarities, produce a signature which is diagnosed by a system control ASIC. The pressure and temperature information from each path is synchronously sampled, as noted above and fed into a data register which the system control ASIC interfaces over a digital bus, in the present embodiment, a serial peripheral interface or SPI. Although various buses can be employed, the SPI is used due to its low cost and high rate of data throughout required for the particular application.

The system control ASIC applies a compensation algorithm to generate a fully compensated, highly accurate pressure signal and temperature signal that the system uses as a control variable in the particular application with which the described embodiment is used.

Information for trimming signals, determined during calibration of the sensor module at the time of manufacture, and coefficients for the compensation algorithm are contained in an electronically erasable programmable read only memory chip (EEPROM) which, in the described embodiment, is external to the multiple sensor ASIC as a cost expedient. Upon power up, the system control ASIC selects the EEPROM through the sensor ASIC by means of the SPI bus and recalls all the coefficients needed to perform selected compensation algorithms and downloads the information. The sensor ASIC trim settings are also recalled from the EEPROM. The exact process is dependent upon the data bus architecture, in the present case an SPI bus; as stated above, the system control ASIC recalls the trim settings from EEPROM and then loads them into the sensor ASIC. The system control ASIC sets up the sensor ASIC by defining the sampling sequence and notifies the system controller when it has completed the sequence. The system controller then recalls the data from the sensor ASIC as needed. The system controller recalls both positive and minus half bridge information, performs compensation algorithms on both halves independently and compares the two signals so that a very precise determination can be made when a sensor is not behaving properly to a finer resolution than is possible using uncompensated half or full bridge data. The system control takes the two compensated pressure and temperature signals, respectively subtracts them to obtain the equivalent of full bridge data.

BRIEF DESCRIPTION OF THE DRAWINGS

The objects, advantages and novel features and methods of the invention will be more fully apparent from the following description when read in connection with the accompany drawings wherein.

DETAILED DESCRIPTION OF PREFERRED EMBODIMENTS

The overall system comprises a pressure sensor system having a plurality of sense elements 1–6, a multiple sensor conditioning (MSC) ASIC 10 and non-volatile memory in the form of EEPROM chip 12 which interfaces with a host system controller in the form of a system control ASIC 14.

The MSC ASIC 10 in turn includes multiplexed ASIC inputs capable of interfacing with the sense elements; redundant half bridge conditioning path architecture 10b3, 10b4, to enable system level fault detection of the sense elements and the ASIC; simplified, trimmable signal conditioning paths 10b1, 10b2 with no thermal compensation; and digital transmission of all data by an SPI bus. The sensor system also includes an EEPROM IC 12 external to MSC ASIC 10 for storing MSC ASIC 10 signal path trim settings (one set for each sense element) and system compensation equation coefficients (one set for each sense element).

A system controller in the form of system control ASIC 14 is interfaced with the pressure sensor system, using the SPI bus, to read ASIC trim settings and system compensation equation coefficients from EEPROM 12; using the SPI bus, to write required operating information to MSC ASIC 10; and, using the SPI bus, to read pressure, temperature and diagnostic/test data from MSC ASIC 10. System controller ASIC 14 also performs mathematical compensation of pressure, temperature and diagnostic information in accordance with selected algorithm equations.

Figure 1:
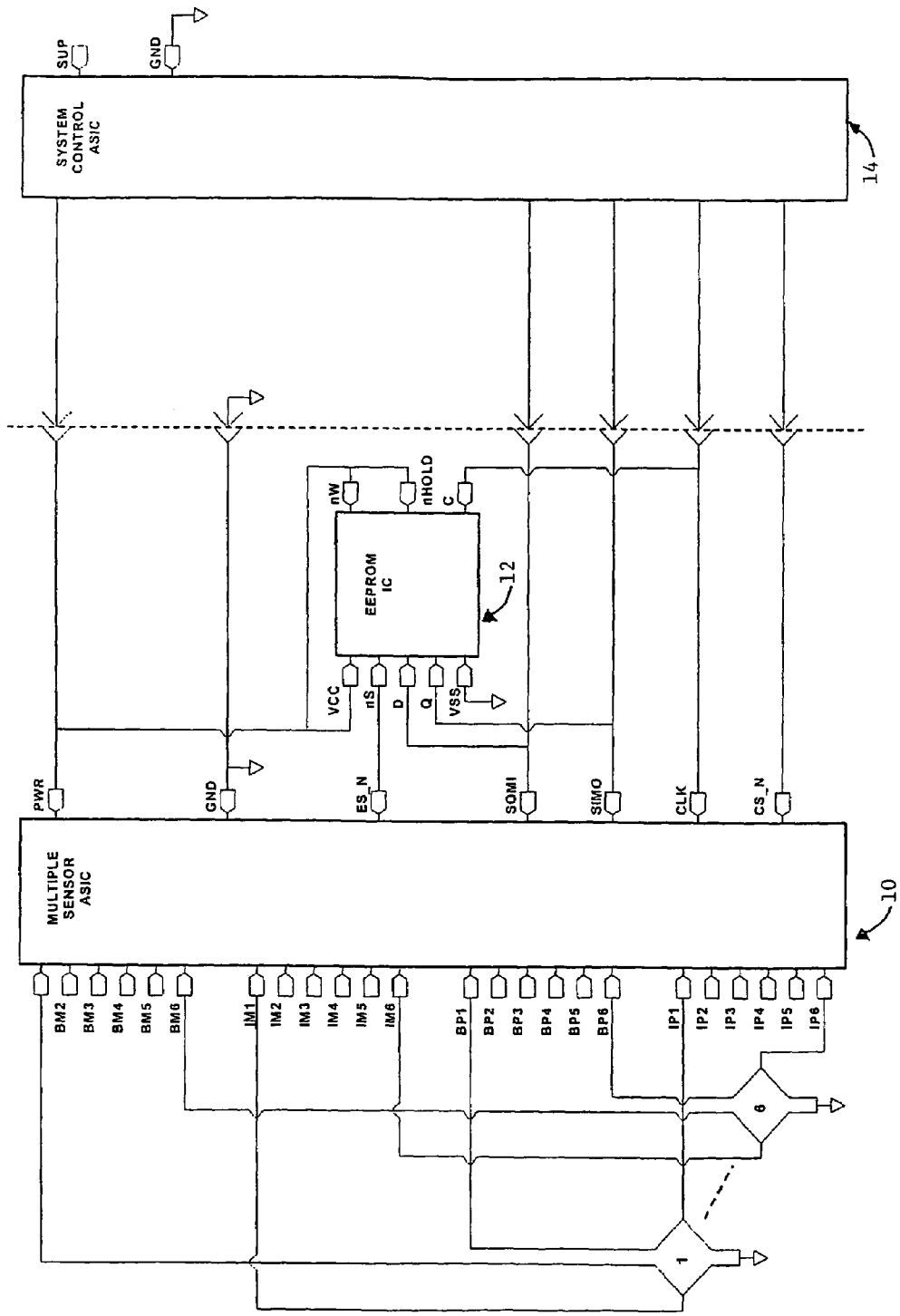
FIG. 1 is a schematic diagram showing a plurality of condition responsive sense elements, each including two separate half bridges, a multiple sensor conditioning circuit in the form of an ASIC, and a non-volatile memory or EEPROM and a system controller in the form of an ASIC.

With reference to FIG. 1, numerals 1 and 6 indicate two of a plurality of sense elements, each in the form of a pair of half bridge structures, in the embodiment shown, there are six sense elements but the particular number is a matter of choice. Although in the preferred embodiment the sense elements are responsive to pressure, the sense elements could also be used to sense other variable conditions suitable for such bridge structures such as acceleration, torque and force.

Figure 2:
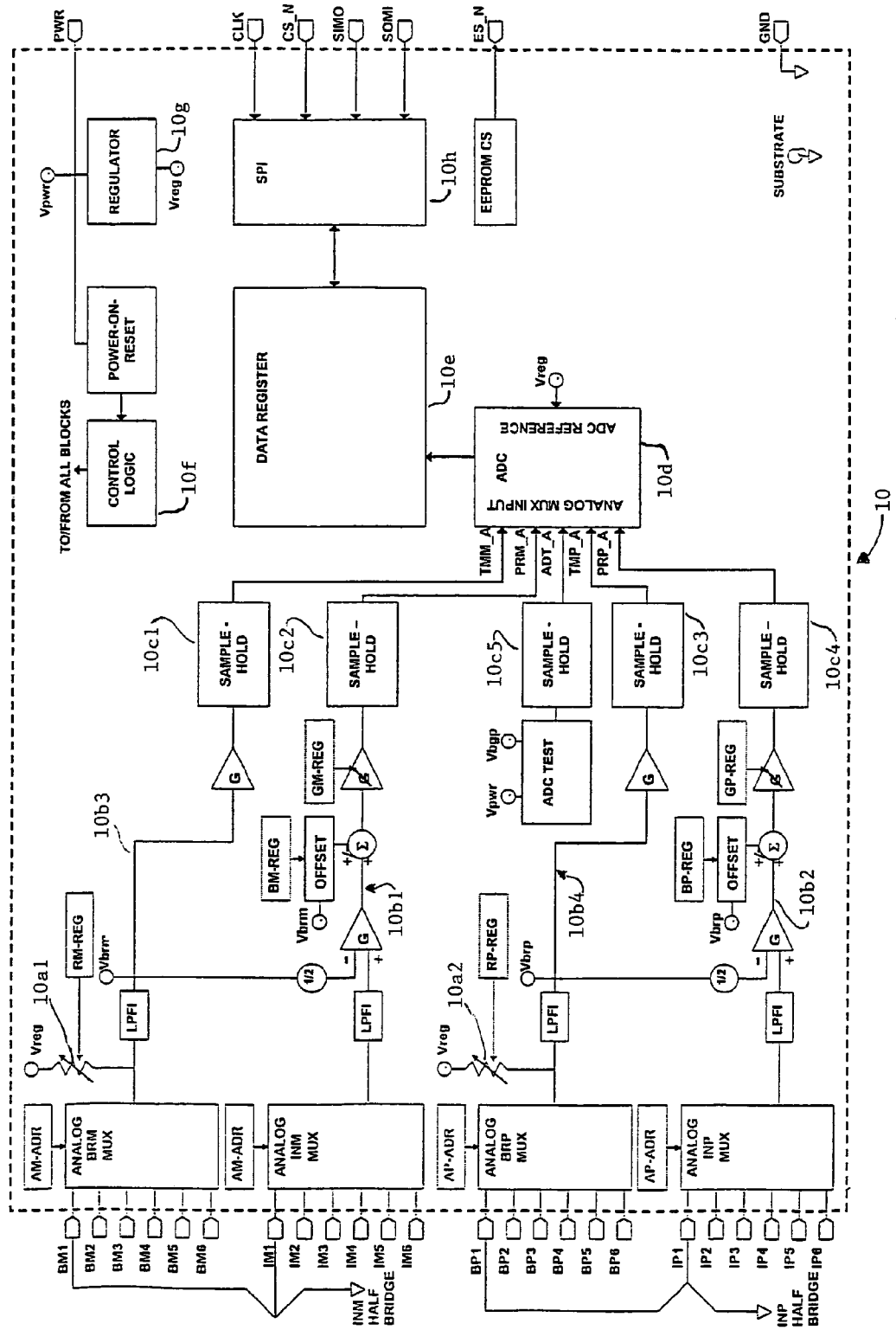
FIG. 2 is a schematic block circuit diagram of the multiple sensor ASIC shown in FIG. 1 along with one sense element shown as illustrative.

As best seen in FIG. 2, sensor ASIC 10 includes four analog multiplexers, BRM, INM, BRP and INP MUXES, each having six address positions BM1–BM6, IM1–IM6, BP1–BP6 and IP1–IP6. Each sense element half bridge has a bridge node connected to BM1–BM6 respectively for the M half bridges and BP1–BP6 respectively for the P half bridges. Each half bridge has a ground node connected to ground. The output nodes of the M half bridges are respectively connected to address positions IM1–IM6 and the output nodes of the P half bridges are respectively connected to address positions IP1–IP6.

Half bridge conditioning is provided to enhance sense element fault detection. MSC ASIC 10 includes a first bias and temperature path and a first pressure conditioning path for the positive half bridge and a second bias and temperature path and a second pressure conditioning path for the negative half bridge with the multiplexer address used to determine which sense element at a given time is biased and connected to the half bridge signal conditioning paths.

For the minus half bridge temperature signal path 10b3, a respective half bridge is selected by multiplexer BRM whose setting is determined by the AM-ADR (address minus-ADR). The half bridge is biased through a programmable series resistor 10a1 whose magnitude is controlled by the RM-REG (resistor minus-REG) value. A low pass filter LPDI is used at the signal input to reject unwanted high frequency signals, for example, EMI or other noise. A fixed amplification is applied to the half bridge bias voltage to increase signal magnitude and improve the resolution of the analog to digital conversion. A sample-and-hold circuit 10c1 stores the signal prior to analog to digital conversion. All the signals to be fed into ADC 10d are sampled and held at the same time to ensure all data is synchronized in time.

For the minus half bridge pressure signal path 10b1, the corresponding half bridge output is selected by multiplexer INM whose setting is determined by the AM-ADR value. A low pass filter LPFI is used at the signal input to reject unwanted high frequency signals, as in the temperature signal path. The difference between the half bridge output and ½ Vbrm (minus half bridge bias voltage reference) is then amplified by a fixed amount. The initial offset voltage of this signal path (e.g., cause by mismatch between the ½ Vbrm reference and the half bridge output due to sense element or ASIC tolerance) is cancelled by summing in a portion of the Vbrm into the signal path. The magnitude and sign of the portion of Vbrm to be summed is determined by the BM-REG (bias minus-REG) value. A variable amplification is applied to the half bridge output signal to increase the signal magnitude and improve the resolution of the analog to digital conversion. The magnitude of the applied gain is determined by the GM-REG value. The sample-and-hold circuit $10c2$ stores the signal prior to analog to digital conversion. As noted above, all the signals to be fed into ADC $10d$ are sampled and held at the same time to ensure all data is synchronized in time.

The analog pressure conditioning paths $10b1$, $10b2$, contain trimmable offset and gain settings to compensate for sense element variations. Each half bridge has uniquely derived offset and pain trim settings that are stored in specific addresses in Data Register $10e$, to be discussed.

The outputs of the analog temperature and pressure signal conditioning paths are inputted to Sample and Hold circuits $10c1$–$10c4$ and Analog to Digital Converter ADC $10d$. The outputs of the ADC are stored in specific addresses in Data Register $10e$.

Voltage regulator $10g$ provides bias sources for the analog and ADC circuits. ASIC and sense element test circuits including ADC test and Sample and Hold circuit $10c5$ are used during ASIC and sensor production.

Control of MSC ASIC $10$ is achieved by sending specific Data Register contents over the Serial Peripheral Interface (SPI) bus $10h$. It should be noted that, if desired, other bus structures could be utilized, however, the SPI is particularly useful in this embodiment due to its low cost and high rate of data throughput.

The SPI bus has a chip select line CS_N, a clock line CLK, a slave input or master output pin SIMO and a slave output or master input pin SOMI. For each connection on the bus there is a chip select line that is unique to each slave with the other lines being common to all the slaves. In the preferred embodiment the system control ASIC $14$ is the master and draws data from and to the MSC ASIC $10$ by setting the chip select pin of sensor MSC ASIC $10$ low and then the clock line clocks data into or out of MSC ASIC $10$ which functions as a slave. EEPROM chip $12$ is connected to SPI bus $10h$. In the specific implementation of the embodiment, when the system ASIC $14$ calls for information from EEPROM chip $12$ it sets the chip select line of MSC ASIC $10$ low and then sends a command to set the ES_N pin which further selects the EEPROM chip $12$ as slave. This particular routine is necessitated by only having one chip select line available from system control ASIC $14$ for the pressure sensor system.

As noted above, non-volatile memory in the form of external electrically erasable programmable read only memory (EEPROM) chip $12$ is connected to MSC ASIC $10$ to store trim settings and communicates with the system control over the SPI bus, however, there is no direct connection between the system controller and the EPROM chip select so MSC ASIC $10$ is used to control the EEPROM chip select. Although the non-volatile memory could be formed as part of MSC ASIC $10$, it is more cost effective to provide the external EEPROM shown.

Typically, the multiple sensor system of the invention is used with a host controller for controlling some function(s) in which the sense information is used. In the present embodiment, system control ASIC $14$ is an automotive brake controller which uses the raw sensor signals to generate fully compensated, highly accurate pressure and temperature signals that the system controller uses as a control variable. System control ASIC $14$ has a great deal of computational power and the sensor system made according to the invention takes advantage of this by allocating that portion of the sensor compensation involving complex calculations to provide optimum efficiency while obtaining highly accurate pressure and temperature values used by system control ASIC $14$ in the brake control. This portion of the sensor compensation will be discussed below in relation to the compensation algorithms.

System control ASIC $14$ takes the minimally conditioned sensor MSC ASIC $10$ digital outputs and applies a mathematical compensation algorithm/equation to achieve the desired values. Although many system compensation algorithms can be employed, the following algorithm is preferred.

Temperature $$T_{PX} = A_{TP0X} + (TMP_X - T_{RFP})^*(A_{TP1X} + (TMP_X - T_{RFP})^* (A_{TP2X} + A_{TP3X}^*(TMP_X - T_{RFP})))$$

where, $T_{PX}$ is the system compensated temperature signal for positive half bridge, X $TMP_X$ is the DSM temperature output signal from positive half bridge, X $T_{RFP}$ is the temperature offset reference for the positive half bridge calculations $A_{TP0X}$ is the zero order compensation coefficient for the selected positive half bridge, X $A_{TP1X}$ is the first order compensation coefficient for the selected positive half bridge, X $A_{TP2X}$ is the second order compensation coefficient for the selected positive half bridge, X $A_{TP3X}$ is the third order compensation coefficient for the selected positive half bridge, X $$T_{MX} = A_{TM0X} + (TMM_X - T_{RFM})^*(A_{TM1X} + (TMM_X - T_{RFM}) ^*(A_{TM2X} + A_{TM3X}^*(TMM_X - T_{RFM})))$$

Where, $T_{MX}$ is the system compensated temperature signal for negative half bridge, X $TMM_X$ is the DSM temperature output signal from negative half bridge, X $T_{RFM}$ is a temperature offset reference for the negative half bridge calculations $A_{TM0X}$ is the zero order compensation coefficient for the selected negative half bridge, X $A_{TM1X}$ is the first order compensation coefficient for the selected negative half bridge, X $A_{TM2X}$ is the second order compensation coefficient for the selected negative half bridge, X $A_{TM3X}$ is the third order compensation coefficient for the selected negative half bridge, X Pressure $$P_{PX} = (PRP_X - (B_{P0X} + (TMP_X - T_{RFP})^*(B_{P1X} + B_{P2X}^* (TMP_X - T_{RFP})))) ^* G_{P0X}^* \{1 + (TMP_X - T_{RFP})^* (G_{P1X} + (TMP_X - T_{RFP})^*(G_{P2X} + G_{P3X}^*(TMP_X - T_{RFP})))\} + O_P$$

Where, $P_{PX}$ is the system compensated pressure signal from positive half bridge, X $PRP_X$ is the DSM pressure output signal from positive half bridge, X $TMP_X$ is the DSM temperature output signal form positive half bridge, X $T_{RFP}$ is a temperature offset reference for the positive half bridge calculations $B_{P0X}$ is the zero order thermal offset compensation coefficient for the selected positive half bridge, X $B_{P1X}$ is the first order thermal offset compensation coefficient for the selected positive half bridge, X $B_{P2X}$ is the second order thermal offset compensation coefficient for the selected positive half bridge, X $G_{P0X}$ is the zero order thermal gain compensation coefficient for the selected positive half bridge, X $G_{P1X}$ is the first order thermal gain compensation coefficient for the selected positive half bridge, X $G_{P2X}$ is the second order thermal gain compensation coefficient for the selected positive half bridge, X $G_{P3X}$ is the third order thermal gain compensation coefficient for the selected positive half bridge, X $O_P$ is a compensation equation offset constant $$P_{MX} = \{PRM_X - (B_{M0X} + (TMM_X - T_{RFM})^*(B_{M1X} + B_{M2X}^* (TMM_X - T_{RFM})))\}^* G_{M0X}^* \{1 + TMM_X - T_{RFM}\}^* (G_{M1X} + (TMM_X - T_{RFM})^*(G_{M2X} + G_{M3X}^*(TMM_X - T_{RFM})))\} + O_M$$

where, $P_{MX}$ is the system compensated pressure signal for the selected negative half bridge, X $PRM_X$ is the DSM pressure output signal for the selected negative half bridge, X $TMM_X$ is the DSM temperature output signal for the selected negative half bridge, X $T_{RFM}$ is a temperature offset reference for the negative half bridge calculations $B_{M0X}$ is the zero order thermal offset compensation coefficient for the selected negative half bridge, X $B_{M1X}$ is the first order thermal offset compensation coefficient for the selected negative half bridge, X $B_{M2X}$ is the second order thermal offset compensation coefficient for the selected negative half bridge, X $G_{M0X}$ is the zero order thermal gain compensation coefficient for the selected negative half bridge, X $G_{M1X}$ is the first order thermal gain compensation coefficient for the selected negative half bridge, X $G_{M2X}$ is the second order thermal gain compensation coefficient for the selected negative half bridge, X $G_{M3X}$ is the third order thermal gain compensation coefficient for the selected negative half bridge, X $O_M$ is compensation equation offset constant The system then uses the outputs of the compensation algorithm to derive pressure, temperature and diagnostic information as follows:

Normal operation (no fault condition exists):

$$P_X = (P_{PX} - P_{MX})/2$$

$$T_X = (T_{PX} - T_{MX})/2$$

Limp Mode Operation (a detectable fault condition exists, for example, corruption of positive or negative half bridge EEPROM data):

$$P_X = P_{PX} \text{ or } P_{MX}$$

$$T_X = T_{PX} \text{ or } T_{MX}$$

System Level DSM Diagnostics:

$$P_{DX} = (P_{PX} + P_{MX})/2$$

$$TD_X = (T_{PX} + T_{MX})/2$$

Note: System must compare $PD_X$ and $TD_X$ to thresholds to detect certain sensor and system faults.

Figure 3:
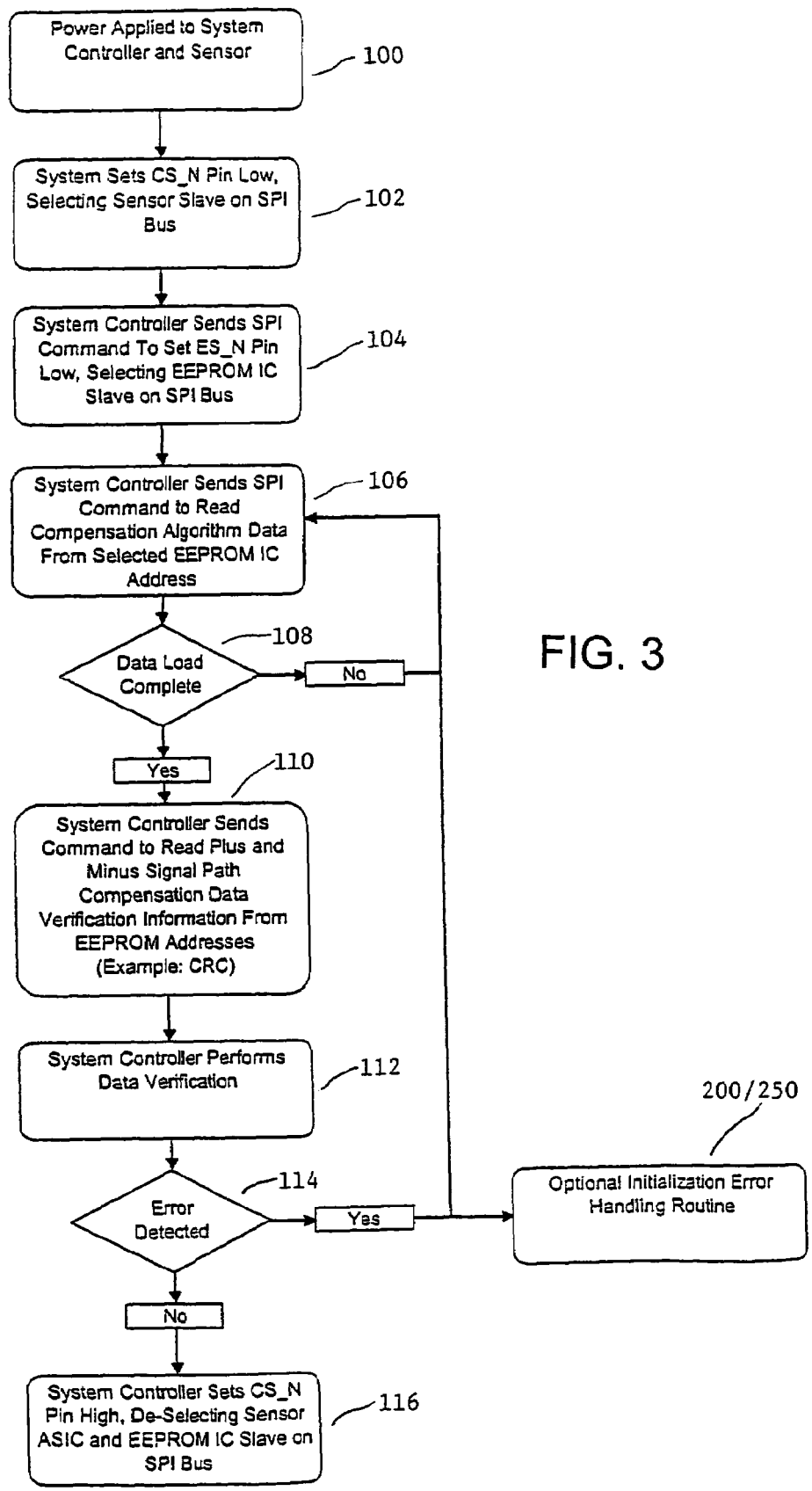
FIG. 3 shows an initialization sequence for transfer of compensation data from the pressure sensor to the system controller.

With reference to FIG. 3, the initialization routine loads algorithm compensation coefficients that are stored in EEPROM 12 to enable system ASIC 14 to perform the compensation procedures on the raw data transmitted from MSC ASIC 10. The initialization routine starts at 100 where power is applied to system controller 14 and MSC ASIC 10. At step 102, the system controller ASIC sets the MSC ASIC 10 chip select pin, CS_N low selecting the sensor as slave on SPI bus 10h. At step 104, the system controller ASIC sends an SPI command to set the ES_N pin low which selects EEPROM 12 as the slave on the bus. As noted above this particular portion of the routine is employed instead of a conventional implementation of chip 12 being selected directly by ASIC 14 as slave due to a limitation of output pins available in the specific architecture used. At step 106, system controller 14 sends an SPI command to read compensation algorithm data from a selected EEPROM 12 address. EEPROM outputs the data in that address and the routine goes through a loop until the data load is completed as determined by decision step 108. When the data load is completed the system controller 14 sends a command at step 110 to read the address storing EEPROM verification data. Although various versions can be utilized, the version employed is a cyclical redundancy check (CRC). This is a check, step 112, involving putting the stored data through a mathematical equation that yields a result which is compared at step 114 to a corresponding result stored in EPROM 12. If an error is detected than the routine loops back to step 106 re-gathering the information. When no error is detected, system controller 14 at step 116 deselects ASIC 10 as slave by setting the CS_N pin to a logic high.

Figure 4:
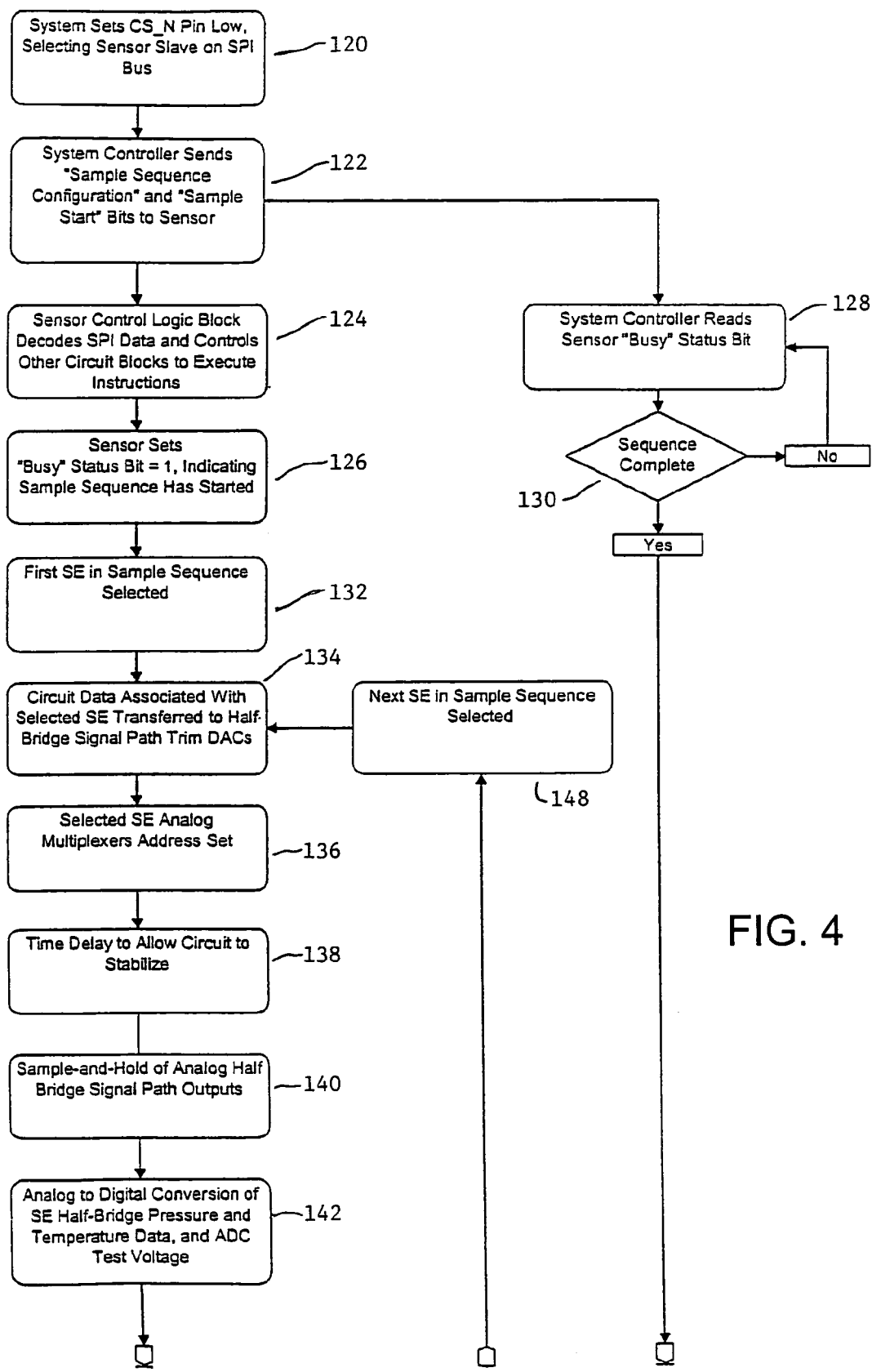
FIGS. 4, 5 and 6 show a sense element data acquisition sequence.
Figure 5:
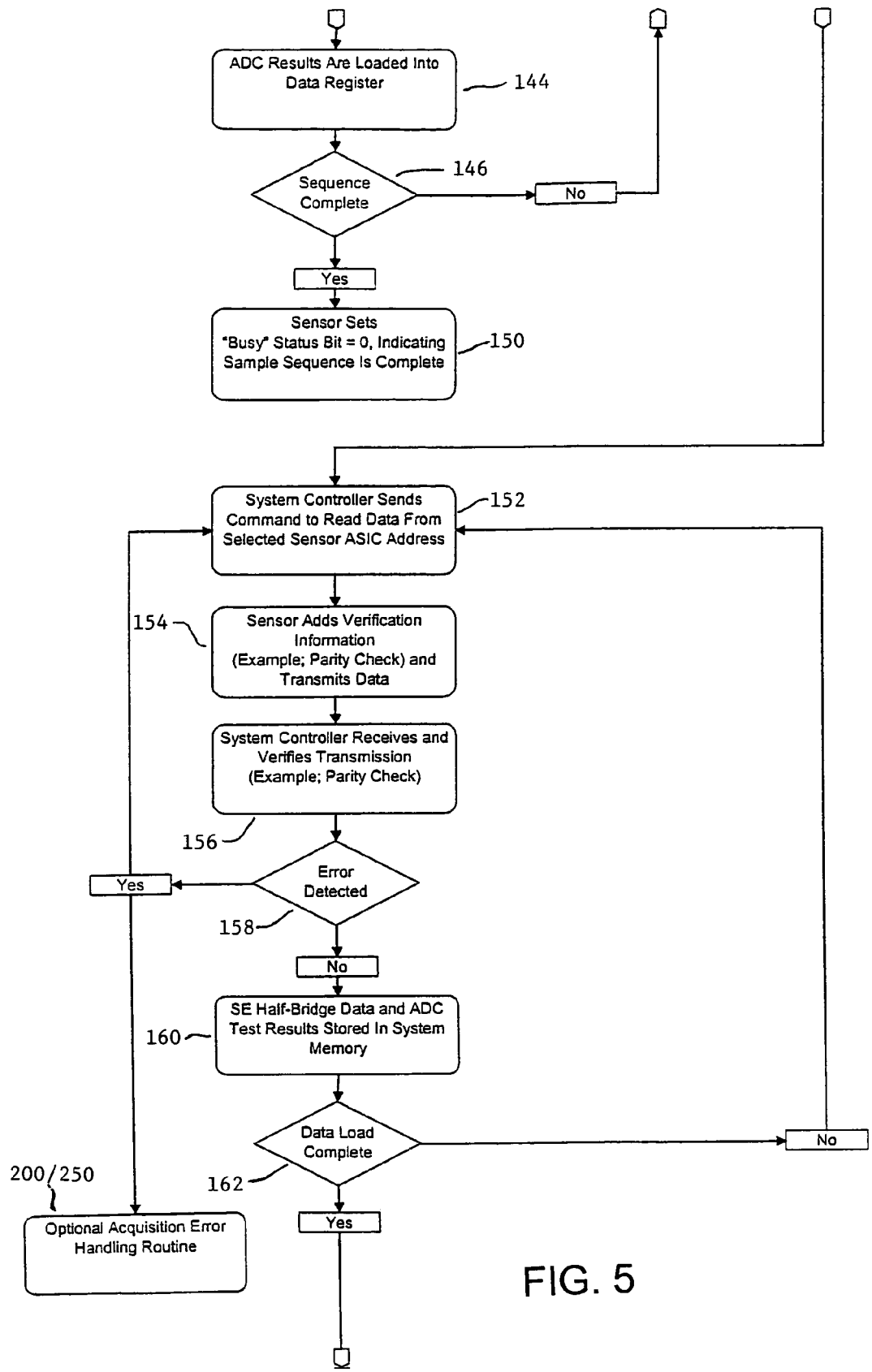
Figure 6:
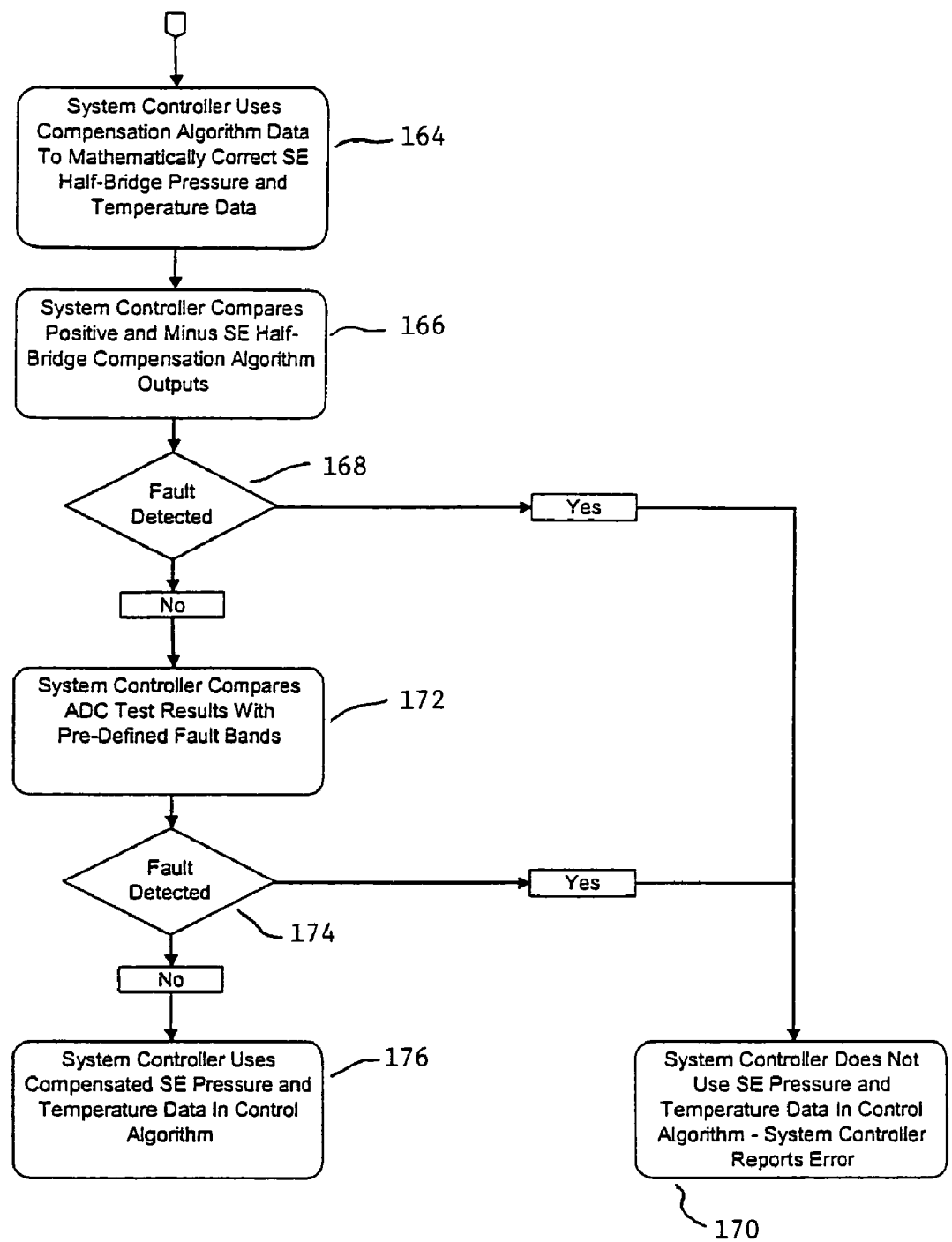

Moving on to FIGS. 4–6 which show the sense element (SE) data acquisition sequence, system controller 14 again sets pin CS_N of ASIC 10 low selecting the sensor as slave on the bus at step 120. Then at step 122, the system sends information to ASIC 10 which contains the sample sequence configuration for the six sensors and a start bit to initiate sampling. This information includes the order as well as which sensors to be sampled. After this step the routine follows two parallel paths. In one path at step 124, the control logic 10f decodes the SPI data and configures its own internal circuitry in order to conduct the sampling in the requested order and number. At step 126, MSC ASIC 10 sets a "busy" status bit equal to 1, indicating that the sampling sequence is proceeding. Meanwhile in the parallel routine branch at step 128, the system controller reads the sensor "busy" status bit and decision step 130 looks to see if the sequence has been completed; if not, the subroutine loops back to step 128.

Following step 126 in the first branch, the first sense element in the sampling sequence is selected at step 132, the circuit data associated with the selected sense element is transferred to the relevant half bridge signal conditioning path at step 134. At step 136, the multiplexers addresses are set selecting the specific bridge whose data is being input to the circuit. A specified time delay is implemented at step 138 to allow the circuit to stabilize. Following stabilization, the Sample and Hold circuitry simultaneously receive the analog half bridge signal conditioning path outputs at step 140. The analog to digital converter 10d then at step 142 sequentially goes through the four signals of the two half bridges as well as an ADC test voltage from Sample and Hold circuit 10c5.

After the analog to digital conversions of the selected sense element pressure, temperature and ADC test voltage are completed, the results are loaded into the data register 10e at step 144 and following decision step 146, if the sequence has not been completed, the routine goes on to the next sense element in the sampling sequence at step 148. If the sequence has been completed following decision block 146, MSC ASIC 10 sets the "busy" status bit to zero at step 150 indicating that the sampling sequence has been completed.

In the meantime, the system controller continues to pole the status of the sequence which is reviewed at decision block 130, and once the "busy" status bit is changed to zero a command is sent to read data from a selected MSC ASIC 10 address at step 152. In the same way that EEPROM 12 was selected in the initialization routine, the system controller 14 sends a command which contains a read bit and the address from which the data is to be recalled. The sensor ASIC adds verification information to the data address such as a parity check and transmits the requested data at the address plus the verification information attached to it at step 154.

The system controller receives the data at step 156 and performs the appropriate calculations and if the verification calculations match at decision step 158, then it considers the data as valid. If they do not match an error is indicated and the routine loops back to step 152 to reread the data. If no error is detected, the sense element half bridge data and ADC test results are transferred to system memory at step 160 and the data load cycle continues until all the information for all the requested sense elements has been completed as determined in decision step 162.

When the data load is completed, the system controller at step 164 uses the compensation algorithm data it recalled during the initialization sequence and applies it to the sense element half bridge pressure and temperature data using the above described compensation algorithms. At step 166, the system controller compares the positive and minus sense element half bridge compensation algorithm outputs and at decision step 168 if a fault is detected the system does not use the data but reports an error at step 170. If no error is detected, the system controller then compares the ADC test results with pre-defined fault bands at step 172 and if a fault is detected at decision step 174, again the data is not used by the system controller and an error reported at step 170. If no error is detected then the data is considered valid and the system controller uses the compensated sense element pressure and temperature data in its control algorithm (not shown).

Although the sequence of FIGS. 4–6 indicated that if a fault is detected the data may not be used by the controller, as noted in FIG. 3 at decision step 114, there are certain situations in which a portion of the data can be used. Two examples of which are shown in FIGS. 7 and 8.

Figure 7:
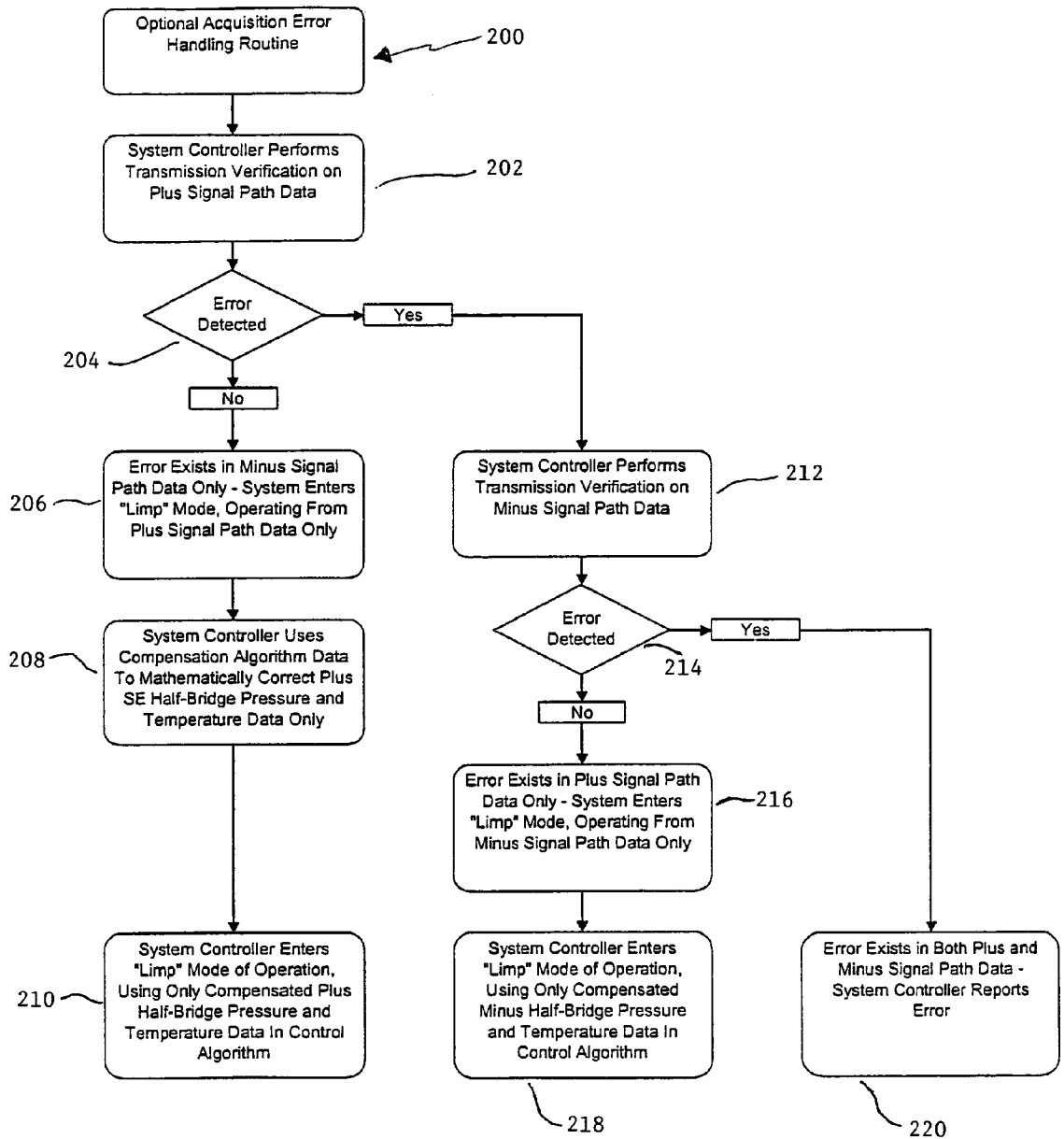
FIGS. 7 and 8 show optional initialization error handling routines.

With reference to FIG. 7, an optional initialization error handling routine 200 is shown when an error is detected in which the system controller performs transmission verification on the plus signal path data at 202. If an error is not detected at decision step 204, then the error exists only in the minus signal path data and the system enters a limp mode at step 206, using the plus path data only. At step 208, the system controller uses compensation algorithm data to mathematically correct the plus sense half bridge pressure and temperature data only and at step 210 enters the limp mode of operation in the control algorithm.

Going back to decision step 204, if an error is detected in the plus signal path then at step 212 the system controller performs transmission verification on the minus signal path data. If no error is detected at the decision step 214 then the error exists only in the plus signal path and the system enters the limp mode operating from the minus signal path data only at step 216 and at step 218 the system uses only compensated minus half bridge pressure and temperature data in the control algorithm. If an error is detected at decision step 214 then an error exists in both plus and minus signal paths and a step 220 the system controller reports an error.

Figure 8:
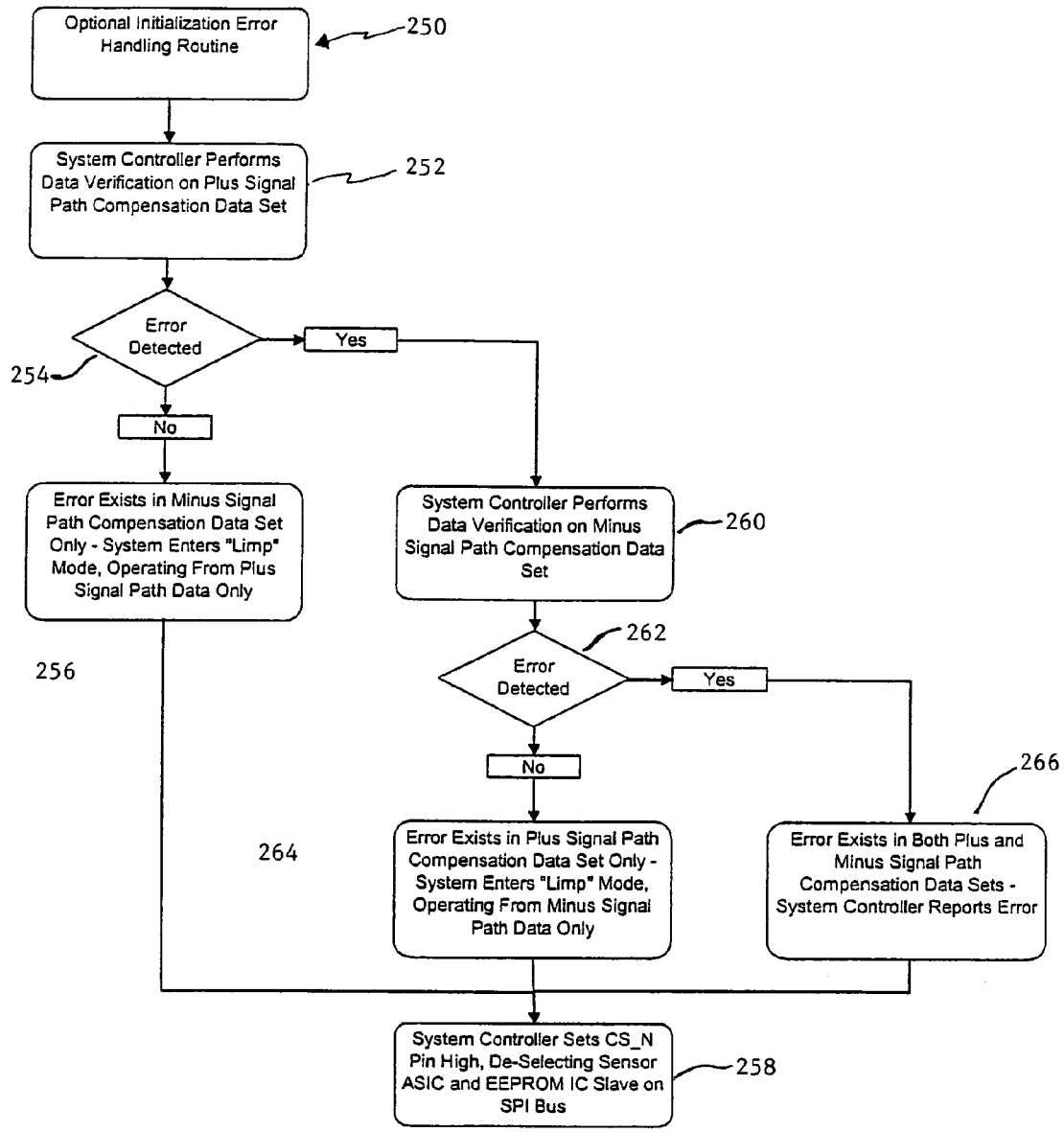

Another optional error handling routine 250 is shown in FIG. 8 when an error is detected in which the system controller at step 252 performs data verification on the plus signal path compensation data and if no error is detected at decision step 254 then the error exists only in the minus signal path compensation data set and the system enters a limp mode at step 256 operating from the plus signal path only and at step 258 the system controller sets the CS_N pin high, deselecting the sensor MSC ASIC and EEPROM IC as slaves on the SPI bus. If an error is detected at decision step 254 then the system controller at step 260 performs data verification on the minus signal path compensation data set. If no error is detected at decision step 262 then an error exists only in the plus signal path and the system enters the limp mode operating from minus signal path data only and then goes on to step 258 setting the CS_N pin high. If an error is detected at step 262, then an error exists in both the plus and the minus paths of the compensation data sets and at step 266, the system controller reports an error and goes onto step 258 setting the CS_N pin high.

In accordance with the invention, the transmission of digital data between the sensor ASIC and the system controller avoids deleterious contributions to sensor accuracy in the system. For example, ADC conversion errors in the system, output loading effects on analog signals, and so on. The system based computation of the thermally compensated signal provides greater signal accuracy and tighter diagnostic thresholds than can be achieved by a sensor system architecture performing the thermal compensation within the sensor system itself. Further, the use of existing computational power of the system controller 14 provides the compensation operation for very little cost, if any, since only a small additional amount of memory for additional program space and data storage is required, and avoids the high cost associated with implementing the thermal compensation in the sensor ASIC, i.e., ASIC die area and test cost. The invention provides low cost signal conditioning for multiple sense elements while also providing high accuracy and robust fault coverage by the strategic partitioning of the signal conditioning between the two integrated circuits 10 and 14 to allow low cost per pressure sensing function, improved sensor accuracy and diagnostic capability and by the provision of sense elements each having two half bridges with identical signal conditioning paths for each half.

While a preferred embodiment of the present invention has been disclosed in detail, it should be understood that various modifications, such as using sense elements responsive to conditions other than pressure, such as acceleration, torque, force and the like mentioned supra, may be adopted without departing from the spirit of the invention or scope of the appended claims. Further, although non-volatile memory is used in the preferred embodiment, it is within the purview of the invention to use other forms of data storage, such as bar code labels or the like.

What is claimed is:

1. A variable condition responsive sensor system comprising a plurality of variable condition sense elements having first and second half bridges, the first half bridge providing a first output and the second half bridge providing a second output, and additionally the first half bridge having a first bias node and the second half bridge having a second bias node, the variable condition being one of pressure, acceleration, force and torque, first and second signal conditioning paths at least one multiplexer with addressable ports connected to both the output and the bias node of each half bridge of the plurality of sense elements, the at least one multiplexer having an output port connected to at least one signal conditioning path of the first and second signal conditioning paths, the first output of the plurality of sense elements connected through the at least one multiplexer to the first signal conditioning path and the second output of the plurality of sense elements connected through the at least one multiplexer to the second conditioning path, the first bias node of the plurality of sense elements connected through the at least one multiplexer to the first signal conditioning path and the second bias node of the plurality of the sense elements connected through the at least one multiplexer to the second signal conditioning path, memory for storing calibration and characterization data for the plurality of sense elements and the signal conditioning paths, and an interface circuit for transmitting data from the memory to the signal conditioning components for separately conditioning the signals of the plurality of sense elements and to an external controller to perform mathematical corrections of the conditioned signals and for comparing the conditioned signals of the plurality of sense elements.

2. A variable condition responsive sensor system according to claim 1 in which each half bridge has a bias node and a ground node and further comprising an independent variable resistor connected in series between a voltage source and an output port of the at least one multiplexer.

3. A variable condition responsive sensor system according to claim 1 in which the signal conditioning paths and the at least one multiplexer are formed in an ASIC.

4. A variable condition responsive sensor system according to claim 3 in which the memory is non-volatile.

5. A variable condition responsive sensor system according to claim 4 in which the non-volatile memory is formed in a separate IC.

6. A variable condition responsive sensor system according to claim 1 in which the variable condition is pressure.

7. A variable condition responsive sense element system comprising a plurality of variable condition responsive sense elements providing an output dependent on the variable condition, the variable condition being one of pressure, acceleration, force and torque, the sense elements each having first and second half bridges, each bridge half having a bias node, a ground node and a respective positive and minus output node, a voltage source, an electronic circuit having first, second ,third and fourth multiplexers, each having an output and a plurality of address input positions, a respective independent variable resistor connected in series between the voltage source and the output of each of the first and third multiplexers, the bias node of each half bridge of each sense element connected to a respective multiplexer address position of the respective first and third multiplexers, the minus output node of each sense element connected to a respective multiplexer address position of the second multiplexer, the positive node of each sense element connected to a respective multiplexer address position of the fourth multiplexer, a respective separate signal path connected to the output of each multiplexer, an analog to digital converter having a plurality of inputs and an output, the signal paths being connected to the inputs of the analog to digital converter, a data register having an input and an output, the output of the analog to digital converter connected to the input of the data register, a data transfer circuit connected to the data register and having connections for an external controller, and data transmitted to and received from the external controller through the data transfer circuit, a memory, the memory section being connected to the data transfer circuit, the memory providing analog trim settings for the sense element signal paths, and data for the external controller enabling the external controller to perform mathematical compensation for the variable condition sense element signals.

8. A variable condition responsive sensor system according to claim 7 in which the data transfer circuit is a serial peripheral interface bus.

9. A method for detecting sensor faults in a variable condition responsive sensor system having a plurality of variable condition sense elements, the method of forming each of the sense elements so as to have first and second half bridges, the first half bridge providing a first output and the second half bridge providing a second output, providing at least one multiplexer with addressable ports connected to the outputs of each half bridge of the plurality of sense elements, separately conditioning output signals from each output of a selected sense element, and comparing a linear computation of the separately conditioned signals of the first and second half bridges of the selected sense element with selected tolerance bands.

10. The method of claim 9 in which the step of comparing the separately conditioned signals includes subtracting the conditioned signal of one half bridge from the conditional signal of the other half bridge of a sense element and taking the average of the difference in the two conditioned signals.

11. The method of claim 9 further comprising forming an electronic circuit having signal conditioning paths, the paths having signal conditioning components for each halt bridge output, obtaining electronic calibration data for each sense element during manufacture of the sensor system and storing that information in memory, connecting the outputs of the bridge halves of a selected sense element to the respective signal conditioning circuit paths using basic calibration data from the memory and separately, partially conditioning the selected output signal, and completing the separate conditioning of the partially conditioned signal by performing mathematical corrections using data transferred from the non-volatile memory to obtain fully conditioned signals before the comparison step of the separately conditioned signals.

12. The method of claim 9 further comprising forming an electronic circuit having multiplexers, a signal conditioning path having signal conditioning components for each half bridge output, an analog to digital converter, memory and an interface circuit for transmitting and receiving data, obtaining electronic calibration data for each half bridge sense element during manufacture of the sensor system and storing that information in memory, connecting the electronic circuit to an external controller, transmitting data from memory to enable the external controller to perform mathematical corrections to a conditional digital signal, selecting an address of the multiplexers for connecting the output of a selected half bridge of a selected sense element to the respective signal conditioning circuit path and to transmit basic calibration data to the signal conditioning components in the signal conditioning path, partially conditioning the addressed sense element half bridge using the basic calibration data transmitted from memory to provide a partially conditioned signal, converting the partially conditioned signal from an analog format to a digital format in the analog to digital converter to provide a digital signal, transmitting the digital signal to the external controller, completing the conditioning of the partially conditioned signal by performing mathematical corrections to the digital signal in the external controller using the data transferred from the memory to obtain fully separately conditioned signals before the comparison step of the separately conditioned signals.

13. The method of claim 12 in which the interface circuit comprises a serial peripheral interface bus.

14. The method of claim 12 in which each half bridge has a bias node and further comprising the step of multiplexing the bias node into connection with an independent variable resistor serially connected to a voltage source.

* * * * *